United States Patent
Douglas et al.

(10) Patent No.: US 11,714,657 B2
(45) Date of Patent: Aug. 1, 2023

(54) SELF OPTIMIZING APPLICATION

(71) Applicant: Red Hat, Inc., Raleigh, NC (US)

(72) Inventors: Stuart Douglas, Orange (AU); Pedro Silva, São Paulo (BR)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 16/999,706

(22) Filed: Aug. 21, 2020

(65) Prior Publication Data

US 2022/0058031 A1 Feb. 24, 2022

(51) Int. Cl.
 *G06F 9/4401* (2018.01)
 *G06F 8/61* (2018.01)
 *G06F 8/41* (2018.01)
 *G06F 8/65* (2018.01)

(52) U.S. Cl.
 CPC ............ *G06F 9/4411* (2013.01); *G06F 8/443* (2013.01); *G06F 8/61* (2013.01); *G06F 8/65* (2013.01)

(58) Field of Classification Search
 CPC .......... G06F 9/4411; G06F 8/443; G06F 8/61; G06F 8/65
 See application file for complete search history.

(56) References Cited

U.S. PATENT DOCUMENTS 9,519,466 B2 12/2016 Delsart
10,846,083 B2 * 11/2020 Hu .............................. G06F 8/76
11,467,828 B1 * 10/2022 Zhang ...................... H04L 67/34
2019/0268164 A1 8/2019 Rossetti et al.
2020/0159509 A1 5/2020 Douglas et al.

OTHER PUBLICATIONS

Antonio Goncalves; Configuring A Quarkus Application With Profiles; Jul. 11, 2019; 10 pages; https://antoniogoncalves.org/2019/11/07/configuring-a-quarkus-application-with-profiles/ (Year: 2019).*
Mastertheboss; Getting started with Quarkus and Hibernate; May 17, 2020; 13 pages; http://www.mastertheboss.com/soa-cloud/quarkus/getting-started-with-quarkus-and-hibernate/ (Year: 2020).*

(Continued)

*Primary Examiner* — S. Sough
*Assistant Examiner* — Kimberly L Jordan
(74) *Attorney, Agent, or Firm* — K&L Gates LLP

(57) ABSTRACT

A system includes a memory a processor. The processor is in communication with the memory. The processor is configured to receive an application, where the application was modified into a second configuration from a first configuration. Next, the processor determines differences in the application between the second configuration and the first configuration. A database is accessed, which includes a set of known potential modifications to the application and a set of patterns. The functionality of the known potential modifications is dependent on at least one of the set of patterns. The differences are analyzed to determine which of the set of patterns to include in the application, where the differences includes at least one of the set of known potential modifications in the application. The processor is configured to modify the application with the at least one of the set of patterns.

20 Claims, 5 Drawing Sheets

(56) References Cited

OTHER PUBLICATIONS

Alex Soto; Home of Quarkus Cheat-Sheet; archived Aug. 11, 2020; 164 pages; https://web.archive.org/web/20200811211906/https://lordofthejars.github.io/quarkus-cheat-sheet/ (Year: 2020).*

Gluon; Gluon Substrate and GraalVM Native Image with JavaFX support; Nov. 21, 2019; 2 pages; https://gluonhq.com/gluon-substrate-and-graalvm-native-image-with-javafx-support/ (Year: 2019).*

Sanne Grinovero; Quarkus and GraalVM: Booting Hibernate at Supersonic Speed, Subatomic Size; Sep. 11, 2019; 15 pages; https://www.infoq.com/presentations/quarkus-graalvm-sao-paulo-2019/ (Year: 2019).*

Red Hat Application Migration Toolkit 4.2; various guides; Mar. 26, 2019; https://access.redhat.com/documentation/en-s/red_hat_application_migration_toolkit/4.2/pdf/getting_started_guide/red_hat_application_migration_toolkit-4.2-getting_started_guide-en-us.pdf [links to other guides]; 186 pages (Year: 2019).*

Scenario 1: Moving existing apps to the cloud; https://github.com/RedHat-Middleware-Workshops/modernize-apps-katacoda/blob/59fe8477e7c05609e9b61848de1168c7533ea76b/docs/cdk-docs/md/01-moving-existing-apps.md; Sep. 5, 2018; 29 pages (Year: 2018).*

Windup Rulesets; https://github.com/windup/windup-rulesets/tree/master/rules-reviewed; 2018; 15 pages (Year: 2018).*

Cai et al.; A Pattern-Based Code Transformation Approach for Cloud Application Migration; 2015; 8 pages (Year: 2015).*

Prete et al. A Pattern-Based Code Transformation Approach for Cloud Application Migration; 2010; 10 pages (Year: 2010).*

2013vera++; Apr. 10, 2013; 1 page (Year: 2013).*

Paul Wögerer, "Simplifying Native-Image Generation with Maven Plugin and Embeddable Configuration", GraalVM team blog—https://www.graalvm.org, Posted Mar. 19, 2019, Retrieved on or before Jun. 1, 2020 (7 pages).

Oleg Šelajev, "GraalVM: Native Images in Containers", https://aws.amazon.com/blogs/opensource/using-graalvm-build-minimal-docker-images-java-applications/, Posted May 15, 2019, Retrieved on or before Jun. 1, 2020 (8 pages).

Indrek Ots, "Running Spring Boot apps as GraalVM native images | That which inspires awe", https://blog.indrek.io/articles/running-spring-boot-apps-as-graalvm-native-images/, Posted Jan. 6, 2020, Retrieved on or before Jun. 1, 2020 (6 pages).

"JavaFX on Embedded, using GraalVM Native-Image", https://gluonhq.com/javafx-on-embedded-using-graalvm-native-image/, Posted Feb. 18, 2020, Retrieved on or before Jun. 1, 2020 (2 pages).

Oleg Šelajev, "Using GraalVM to Build Minimal Docker Images for Java Applications", GraalVM: Native Images in Containers | Java Magazine, May 15, 2019 (10 pages).

* cited by examiner

SELF OPTIMIZING APPLICATION

BACKGROUND

Computer systems may run applications or services that are provided via a server or cloud. The applications or services can be developed and deployed at runtime. Application instances or services may run within containers, which may be run on physical or virtual machines. The containers may be used to separate various components of a computing system. For example, different components of a computing system may be executed at different containers and/or virtual machines executing on a computing device or multiple computing devices.

The containers may encapsulate a runtime environment for an application instance or service. Application instances may be started or replicated across nodes and each application instance may require configuration objects (e.g., lists, collections, arrays, etc. used for configuration), classes, artifacts, dependencies, annotations, libraries, etc. to be loaded at various times.

SUMMARY

The present disclosure provides new and innovative systems and methods for a self optimizing application. In an example, a method includes receiving an application, where the application was modified into a second configuration from a first configuration. The application is analyzed to determine differences in the application between the second configuration and the first configuration. A database is accessed, where the database includes a set of known potential modifications to the application and a set of patterns, where functionality of each of the set of known potential modifications is dependent on at least one of the set of patterns. The differences are analyzed to determine which of the set of patterns to include in the application, where the differences includes at least one of the set of known potential modifications in the application. The application is modified with the at least one of the set of patterns.

In an example, a system includes a memory a processor. The processor is in communication with the memory. The processor is configured to receive an application, where the application was modified into a second configuration from a first configuration. next, the processor determines differences in the application between the second configuration and the first configuration. A database is accessed, which includes a set of known potential modifications to the application and a set of patterns. The functionality of the known potential modifications is dependent on at least one of the set of patterns. The differences are analyzed to determine which of the set of patterns to include in the application, where the differences includes at least one of the set of known potential modifications in the application. The processor is configured to modify the application with the at least one of the set of patterns.

In an example, a non-transitory machine readable medium storing code, when executed by a processor, is configured to receive an application, where the application was modified into a second configuration from a first configuration. Differences are determined in the application between the second configuration and the first configuration. A database is accessed, which includes a set of known potential modifications to the application and a set of patterns, where functionality of each of the set of known potential modifications is dependent on at least one of the set of patterns. The differences are analyzed to determine which of the set of patterns to include in the application, wherein the differences includes at least one of the set of known potential modifications in the application. The application is modified with the at least one of the set of patterns.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION

Figure 1:
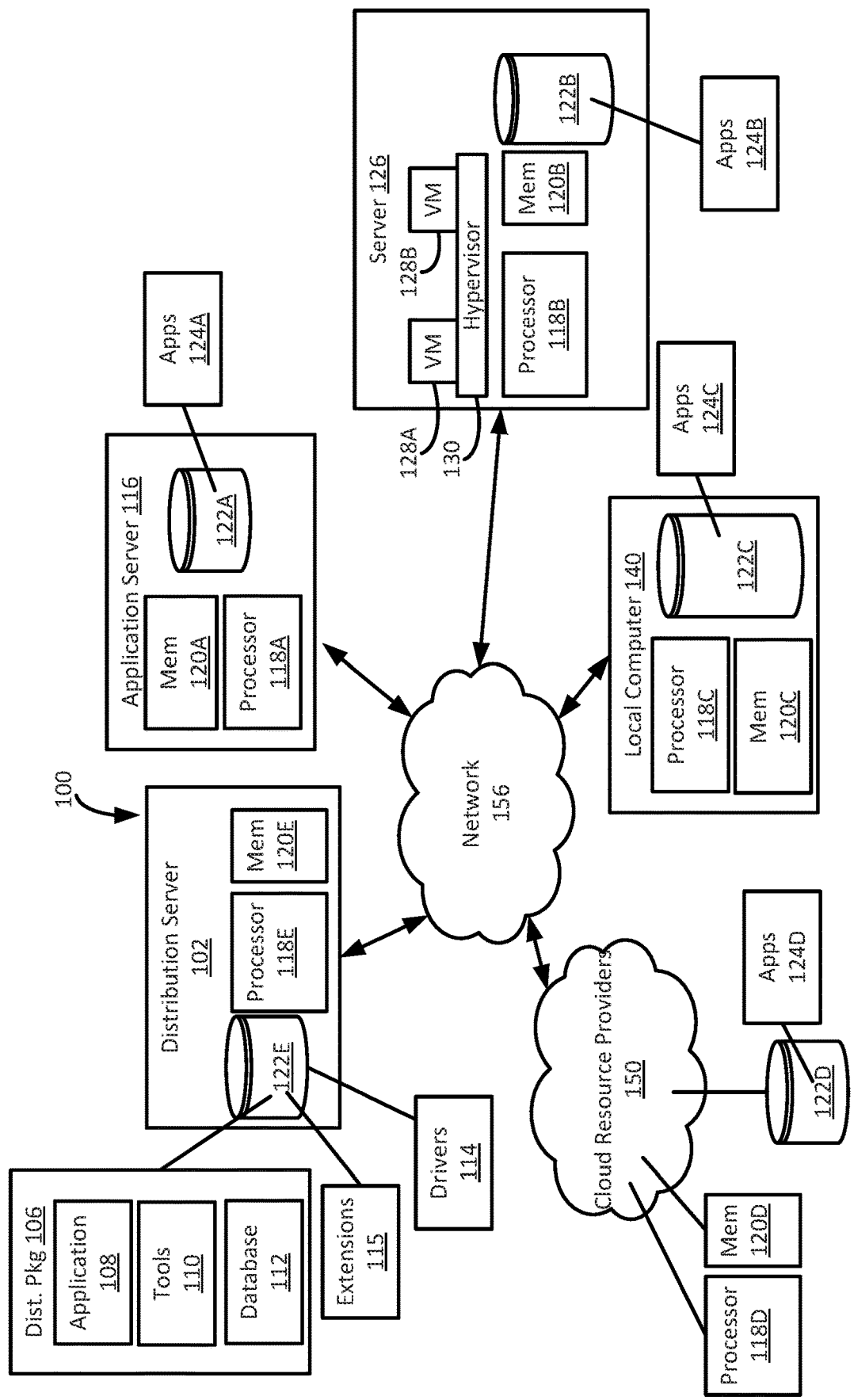
FIG. 1 illustrates a high level component diagram of an example computing system in accordance with one or more aspects of the present disclosure.

Techniques are disclosed for self optimizing an application when compiling into a native compiled configuration. Generally, applications can benefit from being compiled into a native executable image. Although, typically, the process of creating a native compiled image is complex, frameworks (e.g., Quarkus) have improved the viability of native compilation. Conventional techniques include analyzing an application and producing a resulting application that contains enough metadata such that it can be compiled down to a native executable. However, generally, the process of native compilation is limited to build time, which does not provide any flexibility to customize the resulting application at a later date.

As described in various examples disclosed herein, to advance configuration and distribution of natively compiled applications, the systems and methods disclosed herein advantageously analyzes a modified application to determine whether the source code of the application should be updated to support functionality of the modifications. In these examples, an application may be downloaded and installed using a distribution package. The distribution package may include an executable application and one or more tools for reconfiguring the application. In some instances, the one or more tools may include a source code analysis tool and/or an information database. In these instances, the information database may include one or more known potential modifications to the application and associated patterns configured to support and/or implement functionality of one or more of the known potential modifications. For example, a known potential modification may include libraries for adding functionality to the application (e.g., formatting output from the application) and/or extensions for augmenting functionality of the application. In these instances, associated patterns may include libraries and/or source code used for communicating with the known potential modifications (e.g., interface implementation for communicating with a database driver).

In various examples, once an application is modified from an original configuration (i.e., a first configuration) to an updated configuration (i.e., a second configuration), the associated tools (e.g., source code analyzer) may be used to update the native compiled image. In these examples, additional extensions and/or customization modules may be added to the application. In some examples, the application may be configured to use a specific database and an associated database driver. In many instances, after configuration is complete, a tool installed alongside the application can be prompted to compile the application into a native compiled executable. In these instances, the application may contain tooling necessary to analyze changes to the application (e.g., a source code analyzer) and effectively perform introspection both on itself and any additional extensions installed. In various examples, the information gained from introspection can be used to generate a version of itself that can be compiled into a native image, and initiates this compilation process. In certain instances, the self compilation process may make it easier to create a native executable for various needs without a vendor needing to produce an exact image that meets a target system's requirements (e.g., a cloud provider using a SQL database, Windows 10 using an access database, etc.).

For example, a source code analyzer may analyze a configured version of the application to determine differences from the original configuration of the application. In these instances, the source code analyzer may compare each difference to known potential modifications within a database. Upon correlating any differences with any known potential modifications, the source code analyzer modifies the source code of the application with any patterns associated with the correlated known potential modifications. In various instances, modifications may include additional source code and/or libraries in the source code of the application. In other instances, modifications may be removing one or more portions of source code and/or libraries from the source code of the application. As such, a combined installation package, including an application and tools, provides a self optimizing application that can be adaptive and flexibility configured for any target system configuration.

FIG. 1 depicts a high-level component diagram of an example computing system 100 in accordance with one or more aspects of the present disclosure. The computer system 100 can include an application server 116, server 126, local computer 140, a cloud resource provider 150, a distribution server 102, and combinations thereof, in communication through a network 156. Each of the systems within computing system 100 includes storage (122A-E, 122 generally), a processor or processors (118A-E, 118 generally), and memory (120A-E, 120 generally) and each of the systems are in communication with network 156, which connects each system to every other system within computing system 100.

In FIG. 1, the distribution server 102 stores distribution package 106, extensions 115, and drivers 114 on storage 122E located within the distribution server 102. The distribution server 102 is enabled to provide the distribution package 106, extensions 115, and drivers 114 to various systems within the computing system 100, such as the application server 116, server 126, local computer 140, and cloud resource providers 150. For example, the application server 116 can install the distribution package 106 on storage 122A and provide access to the application 108, tools 110, and database 112 to virtual machines (128A-128B, 128 Generally) hosted on hypervisor 130 on server 126, local computer 140, or to cloud resource provider 150. In other instances, the application 108, tools 110, and database 112 can be installed and used locally, such as on the cloud resource provider 150, local computer 140, or server 126.

As used herein, physical processor or processor 118A-E refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 120A-E refers to a volatile or non-volatile memory device, such as RAM, ROM, EEPROM, or any other device capable of storing data. Processors (e.g., CPUs 118A-E) may be interconnected using a variety of techniques, ranging from a point-to-point processor interconnect, to a system area network, such as an Ethernet-based network. Local connections within each node, including the connections between a processor 118A-E and a memory device 120A-E may be provided by one or more local buses of suitable architecture, for example, peripheral component interconnect (PCI).

Figure 2:
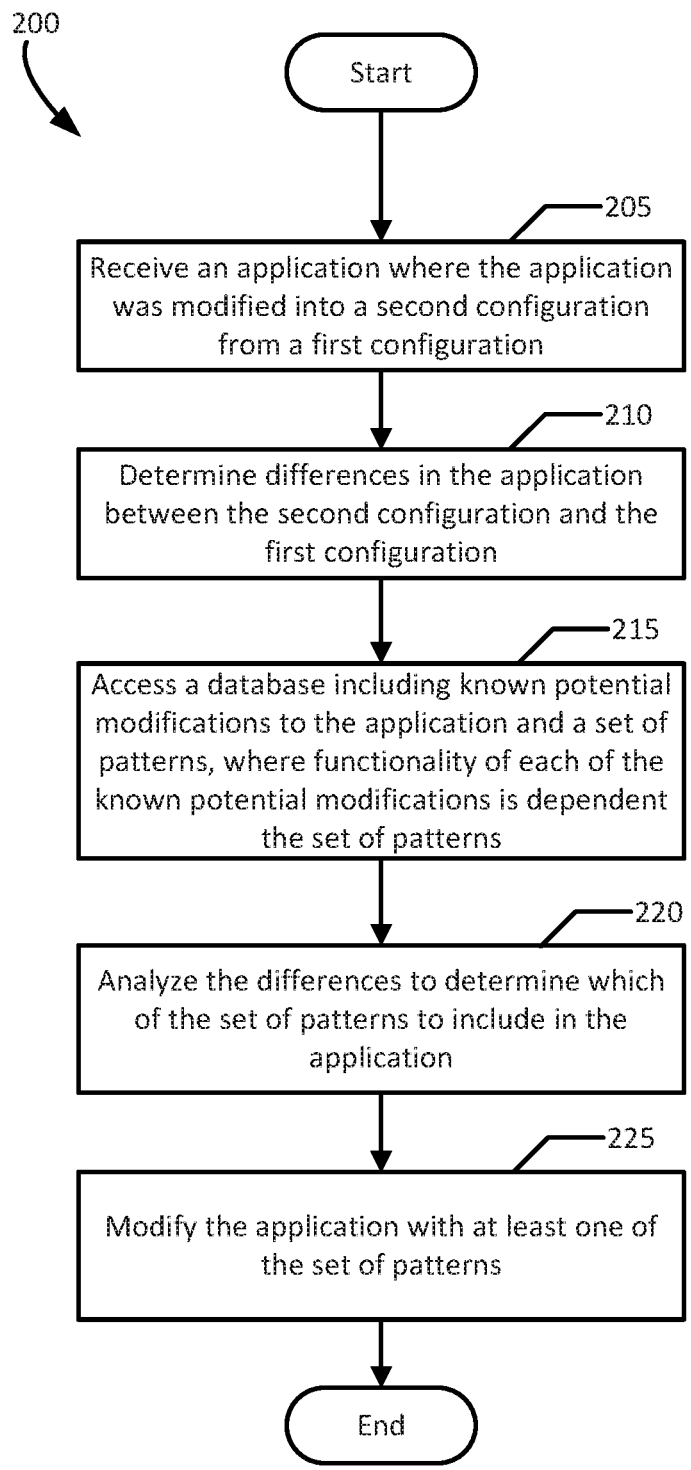
FIG. 2 illustrates a flowchart of an example method of providing self optimization capability for an application, in accordance with an example embodiment of the present disclosure.

FIG. 2 illustrates a flowchart of an example method of providing self optimization capability for an application, in accordance with an embodiment of the present disclosure. Although the example method 200 is described with reference to the flowchart illustrated in FIG. 2, it will be appreciated that many other methods of performing the acts associated with the method 200 may be used. For example, the order of some of the blocks may be changed, certain blocks may be combined with other blocks, blocks may be repeated and some of the blocks described are optional. The method 200 may be performed by processing logic that may comprise hardware (circuitry, dedicated logic, etc.), software, or a combination of both.

As shown in FIG. 2, an application is received, where the application was modified into a second configuration from a first configuration (block 205). For example, an application 108 can be initially compiled into a natively compiled executable configured to operate on local computer 140. In this instance, local computer 140 has storage 122C and applications 124C. However, when moving the application 108 to be built as a container on the cloud resource provider 150, the available applications 124D and storage 122D may be different, thus prompting a change in configuration. As such, the application 108 is reconfigured to operate on the cloud resource provider 150, which may include, but not limited to, selecting a different database driver, adding different extensions configured to operate in the cloud resource provider 150, and/or direct the application 108 to be packaged into a container. As shown, the tools are used to determine differences in the application between the second configuration and the first configuration (block 210). For example, once the application 108 has been configured, the tools 110 may scan the application 108 to determine differences between the second configuration and the first configuration.

As shown in FIG. 2, a database is accessed, where the database includes known potential modifications to the application and a set of patterns, where the functionality of each of the known potential modifications is dependent on the set of patterns (block 215). For example, database 112 includes known potential modifications to the application 108 and associated patterns. In various instances, the associated patterns may include source code for implementing the functionality of the known potential modifications and/or associated with the known potential modifications. For example, if an application 108 was configured to use a driver for a SQL database, the source code of the application 108 may have to be modified with one or more patterns within the database 112 to fully implement the functionality of communicating with the SQL database. Similarly, in another example, an application 108, which was originally configured to use an access database, may require one or more portions of source code to be removed and for a native compiled image to be regenerated. In this instance, source code associated with the access database driver would be removed while the source code associated with the SQL database driver would be added.

As shown in FIG. 2, the differences are analyzed to determine which of the set of patterns to include in the application (block 220). For example, differences in a configuration of the application 108 should be analyzed because those differences may cause the functionality of the application 108 to change. In some instances, a difference in configuration may include adding an extension module 116 for outputting a specific file format. Next, the application is modified with at least one of the set of patterns (block 225). For example, upon finding one or more relevant patterns within the database 112, the tools 110 implement the patterns within the application 108. In some instances, after the application 108 has been modified, the tools 100 may compile the application into a native compiled executable image. In various instances, the tools 110 may be enabled to create a container from the application 108, in preparation for execution in a cloud resource provider 150.

Figure 3A:
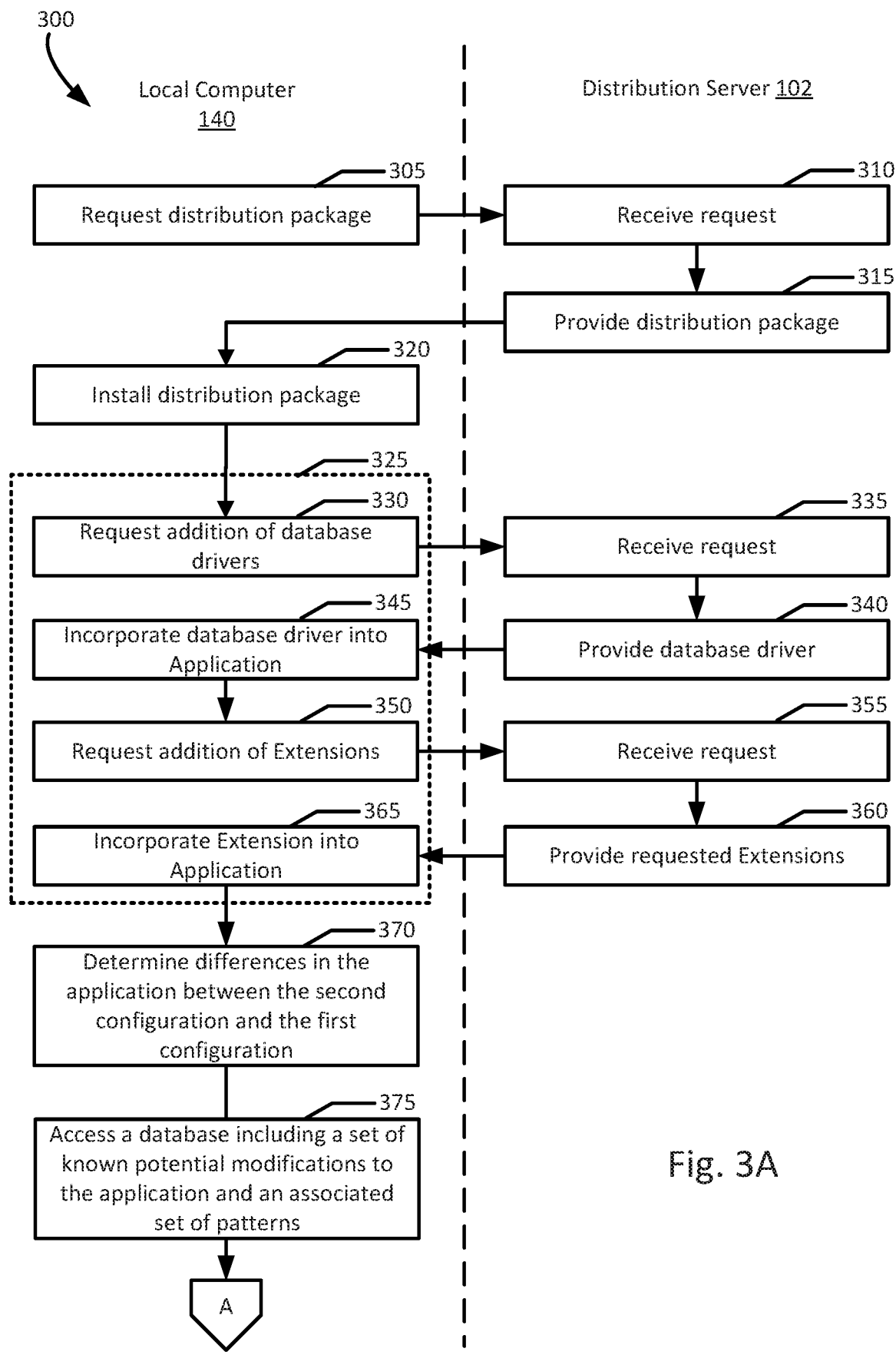
FIGS. 3A and 3B illustrate a flow diagram of an example method of providing self optimization capability for an application according to an example embodiment of the present disclosure.
Figure 3B:
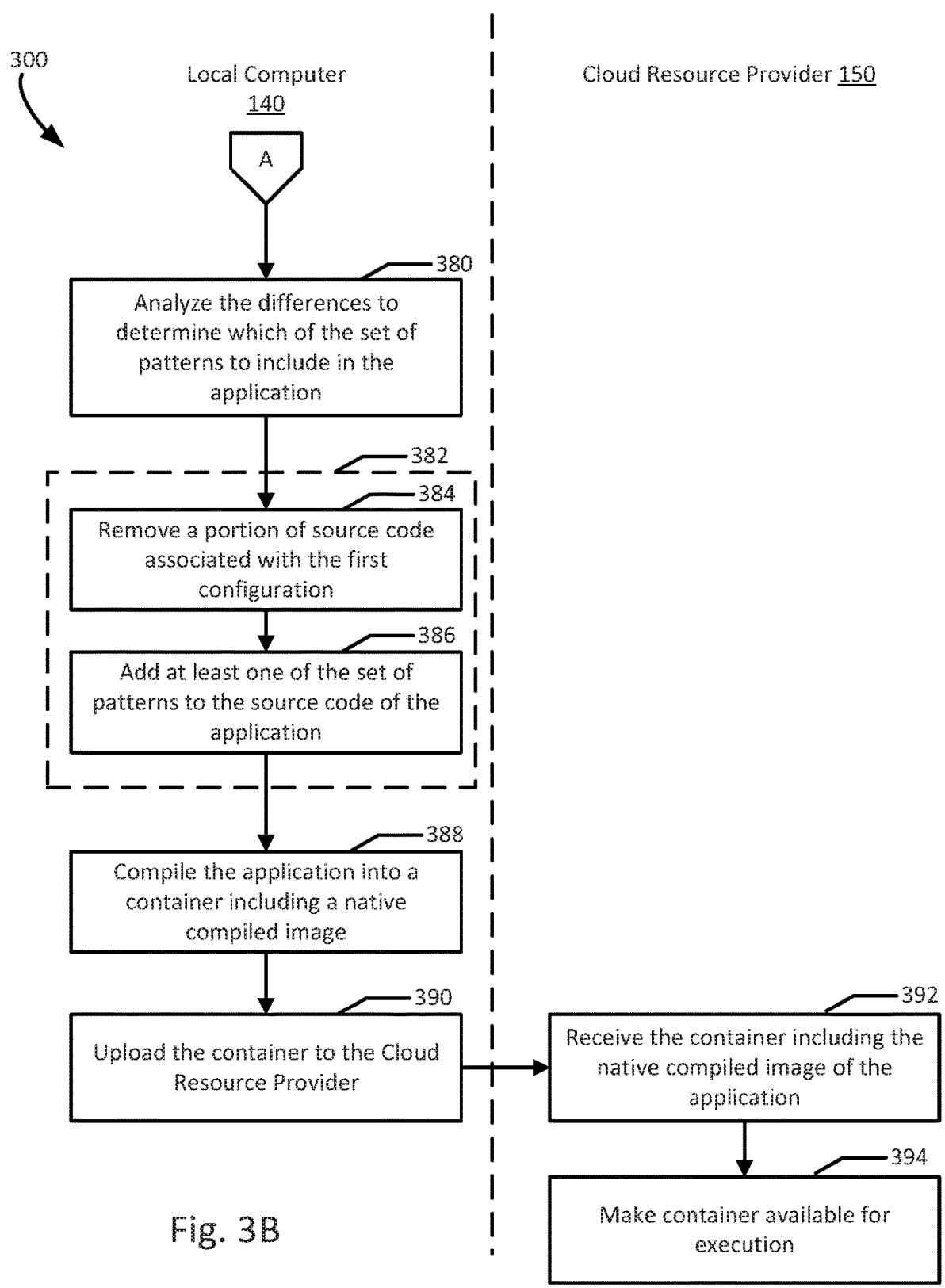

FIGS. 3A and 3B illustrate a flow diagram of an example method providing self optimization capability for an application, in accordance with an embodiment of the present disclosure. Although the example method 300 is described with reference to the flow diagram illustrated in FIG. 3, it will be appreciated that many other methods of performing the acts associated with the method 300 may be used. For example, the order of some of the blocks may be changed, certain blocks may be combined with other blocks, blocks may be repeated, and some of the blocks described are optional. For example, in the illustrated flow diagram, a local computer 140 retrieves a distribution package 106, extensions 115, and database drivers 114 from a distribution server 102. Subsequently, the local computer 140 uploads a native compiled version of the application 108 to the cloud resource provider 150.

As shown in FIG. 3A, a local computer 140 requests a distribution package 106 from the distribution server 102 (block 305). The distribution server 102 receives the request (block 310) and provides the distribution package 106 to the local computer 140 (block 315). In this instance, the distribution package 106 includes application 108, tools 110, and database 112. In various examples, tools 110 may include a source code analysis tool configured to analyze configuration differences in the application 108. In some examples, the tool 110 may modify source code of the application 108 to optimize the application 108 for a native compiled configuration. In these instances, modifications may include adding and/or replacing one or more portions of the source code of the application 108 to support the functionality of a current configuration. In yet other examples, unnecessary portions of source code may be removed, such that the compiled application 108 may be optimized for a native compiled configuration.

In various examples, a database 112 may include known potential modification to an application 108. In these instances, the known potential modifications may include the addition of specific extensions and/or modules to the application 108. In other instances, the known potential modifications may include selection of one or drivers (e.g., a database driver) configured to work with the application 108 (e.g., a SQL database driver). In certain instances, a known potential modification may include changing an output format from a native compiled configuration to a container including the native compiled configuration. As shown in FIG. 3A, the local computer 140 installs the distribution package 106 locally (block 320). The application 108 is modified and/or configured to execute on the local computer 140 (block 325). For example, the local computer 140 may request addition of database drivers 114 (block 330). Upon receiving the request at the distribution server 102 (block 335), the distribution server 102 provides the database driver 114 (block 340). The local computer 140 may incorporate the database driver 114 into the application (block 345). Similarly, in another example, the local computer may request a library or an extension 116 to add to the functionality of the application 108 (block 350). Upon receiving the request (block 355), the distribution server 102 provides the requested extension 116 to the local computer 140 (block 360). The local computer 140 incorporates the extension 116 into the application 108 (block 365).

After modifications have been made to the application 108, the local computer 140 activates the tools 110 to determine differences in the application between the second configuration and the first configuration (block 370). The tools 110 access a database including a set of known potential modifications to the application 108 and an associated set of patterns (block 375). In various examples, known potential modifications are known configurations changes that could be made to the application 108. For example, extensions may be added to an application 108 to configure outputs from the application 108. In another example, extensions may be added to an application 108 to add additional functionality to the application 108, such as collecting and/or displaying different information from the original configuration of the application 108.

As shown in FIG. 3B, tools 110 continues to analyze the differences of the application 108 to determine which of the set of patterns to include in the application (block 380). The tools 110 then modifies the source code to optimize the application (block 382). The modification (block 382) may include removing a portion of source code associated with the first configuration of the application 108 (block 384) and adding at least one of the set of patterns to the source code of the application 108 (block 386). For example, if the application 108 was originally configured to work with an XML database and reconfigured to work with a SQL database, the tool 110 may remove the XML database driver and add a SQL database driver. Further, in other instances, the addition of extensions and/or libraries may require including one or more libraries that support the additional extensions and/or libraries. In some instances, modification of an application may include changing a target platform. For example, an application 108 may originally be configured for execution on a local computer 140 and appropriately compiled for that platform. However, if a new target platform is selected (e.g., a cloud resource provider), tools 110 may add and/or remove libraries to support the new environment (e.g., creating a container for a cloud environment).

Upon completion of any modifications to the source code, the application 108 is compiled into a container including a native compiled image (block 388). Subsequently, the local computer uploads the container to the cloud resource provider 150 (block 390). The cloud resource provider receives the container including the native compiled image of the application (block 392) and makes the container available for execution (block 394).

Figure 4:
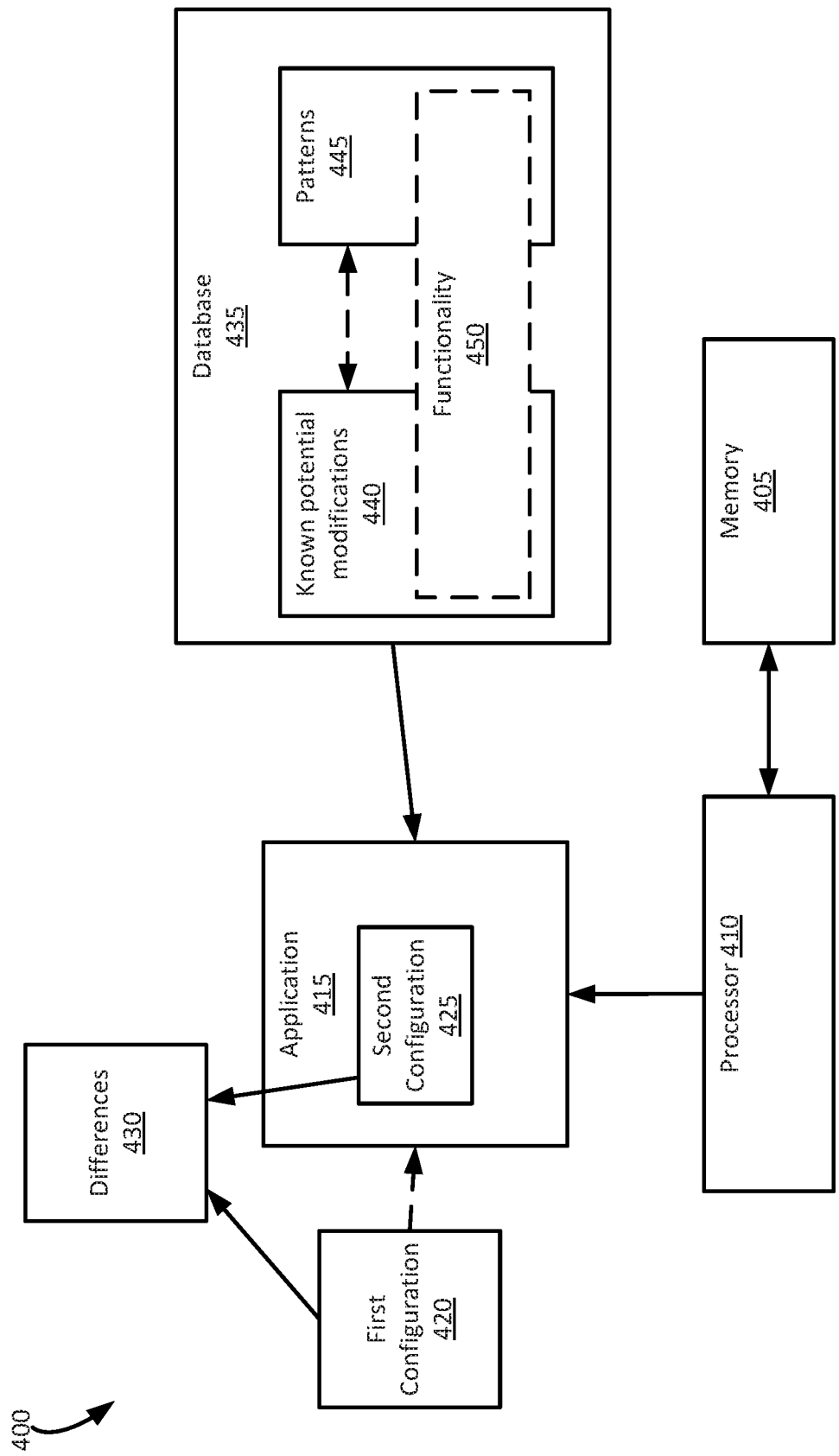
FIG. 4 illustrates a block diagram of an example system optimizing itself after being reconfigured, in accordance with an embodiment of the present disclosure.

FIG. 4 illustrates a block diagram of an example system optimizing itself after being reconfigured, in accordance to one or more aspect of a the present disclosure. The system 400 shown in FIG. 4 includes a memory 405 and processor 410, where the processor 410 is in communication with the memory 405. An application 415 is received, where the application 415 was modified into a second configuration 425 from a first configuration 420. The processor 410 determines the differences 430 between the second configuration 425 and the first configuration 420. A database 435 includes a set of known potential modifications 440 to the application 415 and a set of patterns 445, where the functionality 450 of each of the set of known potential modifications 440 is dependent on at least one of the patterns 445. The differences 430 are analyzed to determine which of the patterns 445 to include in the application 415, where the differences 430 includes at least one of the known potential modifications 440. The processor 410 is configured to modify the application 415 with at least one of the patterns 445.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. A system, comprising:
a memory; and
a processor in communication with the memory, wherein the processor is programmed to:
receive an application included in a distribution package, wherein the application was previously modified into a second configuration from a first configuration;
determine, using at least one tool in the distribution package, differences in the application between the second configuration and the first configuration, wherein the differences include at least one of a change of source code, a change of libraries or dependencies, a change of drivers, or a change of compilation;
access, using the at least one tool in the distribution package, a database including a set of known potential modifications to the application and a set of patterns, where functionality of each of the set of known potential modifications is dependent on at least one of the set of patterns;
analyze, using the at least one tool in the distribution package, the differences to determine which of the set of patterns to include in the application, wherein the differences includes at least one of the set of known potential modifications in the application; and
modify, using the at least one tool in the distribution package, the application with the at least one of the set of patterns.

2. The system of claim 1, wherein the processor is further programmed to:
install the distribution package including the application, one or more tools including the at least one tool, and the database, wherein the application is in the first configuration.

3. The system of claim 2, wherein the processor is further programmed to:
modify the application from the first configuration into the second configuration.

4. The system of claim 1, wherein the processor is further programmed to:
compile the application into a native compiled configuration.

5. The system of claim 1, wherein, when installed, the distribution package includes the application, one or more tools including the at least one tool, and the database.

6. The system of claim 1, wherein the application in the first configuration is known to function when compiled into a native compiled configuration.

7. The system of claim 1, wherein the processor is further programmed to:
compile the application into a container.

8. The system of claim 1, wherein the differences includes one or more extensions.

9. The system of claim 1, wherein the differences includes one or more of the drivers.

10. The system of claim 1, wherein modify comprises:
remove a portion of the source code associated with the first configuration; and
add the at least one of the set of patterns to the source code of the application.

11. A method, comprising:
receiving an application included in a distribution package, wherein the application was previously modified into a second configuration from a first configuration;
determining, using at least one tool in the distribution package, differences in the application between the second configuration and the first configuration, wherein the differences include at least one of a change of source code, a change of libraries or dependencies, a change of drivers, or a change of compilation;
accessing, using the at least one tool in the distribution package, a database including a set of known potential modifications to the application and a set of patterns, where functionality of each of the set of known potential modifications is dependent on at least one of the set of patterns;
analyzing, using the at least one tool in the distribution package, the differences to determine which of the set of patterns to include in the application, wherein the differences includes at least one of the set of known potential modifications in the application; and
modifying, using the at least one tool in the distribution package, the application with the at least one of the set of patterns.

12. The method of claim 11, further comprising:
installing the distribution package including the application, one or more tools including the at least one tool, and the database, wherein the application is in the first configuration.

13. The method of claim 11, further comprising:
compiling the application into a container.

14. The method of claim 11, wherein modifying comprises:
removing a portion of the source code associated with the first configuration; and
adding the at least one of the set of patterns to the source code of the application.

15. A non-transitory machine readable medium storing code, which when executed by a processor causes the processor to:
receive an application included in a distribution package, wherein the application was previously modified into a second configuration from a first configuration;
determine, using at least one tool in the distribution package, differences in the application between the second configuration and the first configuration, wherein the differences include at least one of a change of source code, a change of libraries or dependencies, a change of drivers, or a change of compilation;
access, using the at least one tool in the distribution package, a database including a set of known potential modifications to the application and a set of patterns, where functionality of each of the set of known potential modifications is dependent on at least one of the set of patterns;
analyze, using the at least one tool in the distribution package, the differences to determine which of the set of patterns to include in the application, wherein the differences includes at least one of the set of known potential modifications in the application; and
modify, using the at least one tool in the distribution package, the application with the at least one of the set of patterns.

16. The non-transitory machine readable medium of claim 15, wherein the code, when executed by the processor, further causes the processor to:
install the distribution package including the application, one or more tools including the at least one tool, and the database, wherein the application is in the first configuration.

17. The non-transitory machine readable medium of claim 16, wherein the code, when executed by the processor, further causes the processor to:
modify the application from the first configuration into the second configuration.

18. The non-transitory machine readable medium of claim 15, wherein the code, when executed by the processor, further causes the processor to:
compile the application into a native compiled configuration.

19. The non-transitory machine readable medium of claim 15, wherein, when installed, the distribution package includes the application, one or more tools including the at least one tool, and the database.

20. The non-transitory machine readable medium of claim 15, wherein the application in the first configuration is known to function when compiled into a native compiled configuration.

* * * * *